United States Patent
Chen et al.

(10) Patent No.: US 10,168,586 B2
(45) Date of Patent: Jan. 1, 2019

(54) ELECTRICALLY TUNABLE OPTICAL PHASE MODULATION ELEMENT

(71) Applicant: LIQXTAL TECHNOLOGY INC., Tainan (TW)

(72) Inventors: Hung-Shan Chen, Tainan (TW); Ming-Syuan Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 15/674,511

(22) Filed: Aug. 10, 2017

(65) Prior Publication Data

US 2018/0059490 A1    Mar. 1, 2018

Related U.S. Application Data

(60) Provisional application No. 62/378,687, filed on Aug. 24, 2016.

(51) Int. Cl.
*G02F 1/1343* (2006.01)
*G02F 1/1333* (2006.01)
(Continued)

(52) U.S. Cl.
CPC ...... *G02F 1/134336* (2013.01); *G02F 1/1337* (2013.01); *G02F 1/133345* (2013.01); *G02F 1/29* (2013.01); *G02F 2001/294* (2013.01)

(58) Field of Classification Search
CPC .............. G02F 1/29; G02F 2001/294; G02F 1/134336; G02F 1/133345; G02F 1/1337;
(Continued)

(56) References Cited

U.S. PATENT DOCUMENTS

| | | |
|---|---|---|
| 5,497,254 A | 3/1996 | Amako et al. |
| 5,617,109 A | 4/1997 | DeJule et al. |

(Continued)

FOREIGN PATENT DOCUMENTS

| | | |
|---|---|---|
| CN | 102067242 | 5/2011 |
| TW | 334520 | 6/1998 |

(Continued)

OTHER PUBLICATIONS

Liwei Li et al., "Near-diffraction-limited and low-haze electrooptical-optical tunable liquid crystal lens with floating electrodes," Optics Express, vol. 21, No. 7, Apr. 8, 2013, pp. 8371-8381.

(Continued)

*Primary Examiner* — Jia Pan
(74) *Attorney, Agent, or Firm* — JCIPRNET

(57) ABSTRACT

An electrically tunable optical phase modulation element is provided comprising a first substrate, a second substrate, a liquid crystal layer, a plurality of first stripe electrodes, a first anti-mosaic layer, a first insulating layer, a plurality of second stripe electrodes, a second anti-mosaic layer, a second insulating layer and a controlling circuit. The first stripe electrodes and the first anti-mosaic layer are disposed in between the first substrate and the liquid crystal layer. The second stripe electrodes and the second anti-mosaic layer are disposed in between the second substrate and the liquid crystal layer, wherein an extension direction of the first stripe electrodes intersects with an extension direction of the second stripe electrodes. The electrically tunable optical phase modulation element of the disclosure can be used to eliminate a grid like electrical field generated in conventional electrically tunable lens to provide smoother electrical field distribution and better lens image quality.

19 Claims, 16 Drawing Sheets

100A

(51) Int. Cl.
*G02F 1/1337* (2006.01)
*G02F 1/29* (2006.01)

(58) Field of Classification Search
CPC . H04N 13/0409; H04N 13/31; G02B 27/2214
See application file for complete search history.

(56) References Cited

U.S. PATENT DOCUMENTS

| | | | |
|---|---|---|---|
| 7,755,583 | B2 | 7/2010 | Meredith |
| 9,201,285 | B2 | 12/2015 | Galstian et al. |
| 2011/0025955 | A1 | 2/2011 | Bos et al. |
| 2011/0096251 | A1* | 4/2011 | Son ..................... G02F 1/13338 349/15 |
| 2011/0128456 | A1* | 6/2011 | Son .................. G02F 1/133526 349/15 |
| 2012/0300042 | A1* | 11/2012 | Yun ...................... G02F 1/1343 348/51 |
| 2014/0198099 | A1* | 7/2014 | Tseng ................ G02B 27/2214 345/419 |
| 2014/0285703 | A1* | 9/2014 | Kizu ................... G02F 1/13306 348/340 |
| 2015/0138498 | A1 | 5/2015 | Lin et al. |
| 2016/0041449 | A1 | 2/2016 | Clark et al. |
| 2016/0195739 | A1* | 7/2016 | Choi ..................... G02F 1/1345 349/37 |
| 2018/0205942 | A1* | 7/2018 | Smith ................ G02B 27/2214 |

FOREIGN PATENT DOCUMENTS

| | | |
|---|---|---|
| WO | 2012079178 | 6/2012 |
| WO | 2015136458 | 9/2015 |

OTHER PUBLICATIONS

Nabeel A. Riza, et al., "Three-terminal adaptive nematic liquid-crystal lens device," Optics Letters, vol. 19, No. 14, Jul. 15, 1994, pp. 1013-1015.

Office Action of Taiwan Counterpart Application, dated Oct. 26, 2018, pp. 1-3.

* cited by examiner

ELECTRICALLY TUNABLE OPTICAL PHASE MODULATION ELEMENT

CROSS-REFERENCE TO RELATED APPLICATION

This application claims the priority benefits of U.S. provisional application Ser. No. 62/378,687, filed on Aug. 24, 2016. The entirety of the above-mentioned patent application is hereby incorporated by reference herein and made a part of this specification.

BACKGROUND OF THE INVENTION

1. Field of the Invention

The present invention generally relates to an electrically tunable optical phase modulation element, and in particular, relates to an electrically tunable optical phase modulation element that can provide smoother electrical field distribution and better lens quality.

2. Description of Related Art

Electrically tunable optical phase modulation can be achieved by using a variety of methods, such as through liquid lenses, deformable mirrors, or gradient refractive index lens (GRIN lens). Out of these different methods, electrically tunable GRIN lens has gained a lot of interest due its light and thin structure.

In general, electrically tunable GRIN lens has the basic structure whereby a layer of optoelectronic materials is disposed in between the upper and lower substrate. The optoelectronic materials used are such as liquid crystal materials that may have different refractive index changes when applying different voltages. Through the design of electrodes on the substrates and by applying specific voltages, a phase difference distribution of the optoelectronic material layer can be made to imitate a non-uniform electrical field equivalent to that of a normal lens. However, there are still many drawbacks in the current design of electrodes for generating the non-uniform electrical field. For example, in stripe electrodes where the electrodes extend along the X-Y direction, the electrical field is not smoothly distributed, such that the phase difference may change step by step in a ladder shape form, hence affecting the quality of the lens. As such, there is a need to eliminate a grid like electrical field generated in conventional electrically tunable lens caused by the unsmooth distribution of the phase difference.

SUMMARY OF THE INVENTION

Accordingly, the present invention is directed to an electrically tunable optical phase modulation element that can provide smoother electrical field distribution and better lens quality, and being capable of eliminating the grid like electrical field generated in conventional electrically tunable lens.

The invention provides an electrically tunable optical phase modulation element comprising a first substrate, a second substrate, a liquid crystal layer, a plurality of first stripe electrodes, a first anti-mosaic layer, a first insulating layer, a plurality of second stripe electrodes, a second anti-mosaic layer, a second insulating layer and a controlling circuit. The second substrate is disposed opposite to the first substrate. The liquid crystal layer is disposed in between the first substrate and the second substrate, wherein the liquid crystal layer is adapted to have an effect of a lens in an optically active region. The plurality of first stripe electrodes is disposed in between the first substrate and the liquid crystal layer, wherein a voltage of each of the plurality of first stripe electrodes are independently controlled. The first anti-mosaic layer is disposed in between the first substrate and the liquid crystal layer. The first insulating layer is disposed in between the plurality of first stripe electrodes and the first anti-mosaic layer, such that the plurality of first stripe electrodes and the first anti-mosaic layer are electrically insulated from each other. The plurality of second stripe electrodes is disposed in between the second substrate and the liquid crystal layer, wherein an extension direction of the plurality of first stripe electrodes intersects with an extension direction of the plurality of second stripe electrodes, and a voltage of each of the plurality of second stripe electrodes are independently controlled. The second anti-mosaic layer is disposed in between the second substrate and the liquid crystal layer. The second insulating layer is disposed in between the plurality of second stripe electrodes and the second anti-mosaic layer, such that the plurality of second stripe electrodes and the second anti-mosaic layer are electrically insulated from each other. The controlling circuit is electrically connected to each of the plurality of first stripe electrodes and each of the plurality of second stripe electrodes.

In an embodiment of the invention, an optical phase distribution in the optically active region may include the distribution of spherical lens, non-spherical lens, cylindrical lens, lens arrays, and prism.

In an embodiment of the invention, a material of the liquid crystal layer comprises cholesteric liquid crystals, polymer-dispersed liquid crystals, blue-phase liquid crystals or nematic liquid crystals.

In an embodiment of the invention, the electrically tunable optical phase modulation element further comprises alignment layers disposed on two sides of the liquid crystal layers.

In an embodiment of the invention, a width of each of the plurality of first stripe electrodes are equivalent or different, and a width of each of the plurality of second stripe electrodes are equivalent or different.

In an embodiment of the invention, the gaps between each of the plurality of first stripe electrodes are equivalent or different, and the gaps between each of the plurality of second stripe electrodes are equivalent or different.

In an embodiment of the invention, the first anti-mosaic layer is disposed in between the first substrate and the plurality of first stripe electrodes, or the first anti-mosaic layer is disposed in between the plurality of first stripe electrodes and the liquid crystal layer.

In an embodiment of the invention, when the first anti-mosaic layer is disposed in between the plurality of first stripe electrodes and the liquid crystal layer, the electrically tunable optical phase modulation element further comprises a protection layer disposed in between the first anti-mosaic layer and the liquid crystal layer.

In an embodiment of the invention, the second anti-mosaic layer is disposed in between the second substrate and the plurality of second stripe electrodes, or the second anti-mosaic layer is disposed in between the plurality of second stripe electrodes and the liquid crystal layer.

In an embodiment of the invention, when the second anti-mosaic layer is disposed in between the plurality of second stripe electrodes and the liquid crystal layer, the electrically tunable optical phase modulation element further comprises a protection layer disposed in between the second anti-mosaic layer and the liquid crystal layer.

In an embodiment of the invention, the first anti-mosaic layer and the second anti-mosaic layer are single anti-mosaic layers that cover the optically active region entirely.

In an embodiment of the invention, the first anti-mosaic layer and the second anti-mosaic layer comprise first anti-mosaic stripes and second anti-mosaic stripes arranged in an array in the optically active region.

In an embodiment of the invention, a width of the first anti-mosaic stripes is equal to or greater than a width of a gap between each of the plurality of first stripe electrodes, and a width of the second anti-mosaic stripes is equal to or greater than a width of a gap between each of the plurality of second stripe electrodes.

In an embodiment of the invention, a center line of the first anti-mosaic stripes is aligned with a center line of a gap between each of the plurality of first stripe electrodes, and a center line of the second anti-mosaic stripes is aligned with a center line of a gap between each of the plurality of second stripe electrodes.

In an embodiment of the invention, the electrically tunable optical phase modulation element further comprises first dummy electrodes and second dummy electrodes, wherein the first dummy electrodes are disposed adjacent to the plurality of first stripe electrodes, and the second dummy electrodes are disposed adjacent to the plurality of second stripe electrodes.

In an embodiment of the invention, the first dummy electrodes and the second dummy electrodes are floating electrodes that are not connected to the controlling circuit.

In an embodiment of the invention, a material of the first anti-mosaic layer and the second anti-mosaic layer comprises semiconductors or conductors.

In an embodiment of the invention, each of the plurality of first stripe electrodes have a symmetrical shape or an unsymmetrical shape, and each of the plurality of second stripe electrodes have a symmetrical shape or an unsymmetrical shape.

In an embodiment of the invention, each of the plurality of first stripe electrodes are straight line shaped or curved line shaped, and each of the plurality of second stripe electrodes are straight line shaped or curved line shaped.

In an embodiment of the invention, each of the plurality of first stripe electrodes have the same shape or different shape and each of the plurality of second stripe electrodes have the same shape or different shape, and an arrangement of the plurality of first stripe electrodes is equivalent or different to an arrangement of the plurality of second stripe electrodes.

In an embodiment of the invention, the plurality of first stripe electrodes and the plurality of second stripe electrodes are transparent electrodes, translucent electrodes or opaque electrodes.

The invention further provides an electrically tunable optical phase modulation element including at least one phase modulator. Each of the phase modulator includes a first substrate, a second substrate, a liquid crystal layer, a plurality of first stripe electrodes, a first anti-mosaic layer, a first insulating layer, a second conductive layer and a controlling circuit. The second substrate is disposed opposite to the first substrate. The liquid crystal layer is disposed in between the first substrate and the second substrate, wherein the liquid crystal layer is adapted to have an effect of an optical phase modulation in an optically active region. The plurality of first stripe electrodes is disposed in between the first substrate and the liquid crystal layer, wherein a voltage of each of the plurality of first stripe electrodes is independently controlled. The first anti-mosaic layer is disposed in between the first substrate and the liquid crystal layer. The first insulating layer is disposed in between the plurality of first stripe electrodes and the first anti-mosaic layer, such that the plurality of first stripe electrodes and the first anti-mosaic layer are electrically insulated from each other. The second conductive layer is disposed in between the second substrate and the liquid crystal layer. The controlling circuit is electrically connected to each of the plurality of first stripe electrodes and the second conductive layer.

In an embodiment of the invention, an optical phase distribution in the optically active region may include a distribution of quadratic curve, spherical curve, cylindrical lens arrays, or prism.

In an embodiment of the invention, the electrically tunable optical phase modulation element includes a first phase modulator and a second phase modulator, wherein the second phase modulator is stacked on top of the first phase modulator. An extension direction of the plurality of first stripe electrodes of the first phase modulator intersects with an extension direction of the plurality of first stripe electrodes of the second phase modulator.

In an embodiment of the invention, an optical phase distribution formed by the combination of the first phase modulator and the second phase modulator may include a distribution of spherical lens, non-spherical lens, cylindrical lens, lens arrays, and prism.

In an embodiment of the invention, a material of the liquid crystal layer comprises cholesteric liquid crystals, polymer-dispersed liquid crystals, blue-phase liquid crystals or nematic liquid crystals.

In an embodiment of the invention, the electrically tunable optical phase modulation element further includes alignment layers disposed on two sides of the liquid crystal layer.

In an embodiment of the invention, the width of each of the plurality of first stripe electrodes are equivalent or different.

In an embodiment of the invention, the width of a gap between each of the plurality of first stripe electrodes are equivalent or different.

In an embodiment of the invention, the first anti-mosaic layer is disposed in between the first substrate and the plurality of first stripe electrodes, or the first anti-mosaic layer is disposed in between the plurality of first stripe electrodes and the liquid crystal layer.

In an embodiment of the invention, when the first anti-mosaic layer is disposed in between the plurality of first stripe electrodes and the liquid crystal layer, the electrically tunable lens further comprises a protection layer disposed in between the first anti-mosaic layer and the liquid crystal layer.

In an embodiment of the invention, the first anti-mosaic layer is a single anti-mosaic layer that covers the optically active region entirely.

In an embodiment of the invention, the first anti-mosaic layer comprises first anti-mosaic stripes arranged in an array in the optically active region.

In an embodiment of the invention, a width of the first anti-mosaic stripes is equal to or larger than a width of a gap between each of the plurality of first stripe electrodes.

In an embodiment of the invention, a center line of the first anti-mosaic stripes is aligned with a center line of a gap between each of the plurality of first stripe electrodes.

In an embodiment of the invention, the electrically tunable optical phase modulation element further includes first dummy electrodes, wherein the first dummy electrodes are disposed adjacent to the plurality of first stripe electrodes.

In an embodiment of the invention, the first dummy electrodes are floating electrodes that are not connected to the controlling circuit.

In an embodiment of the invention, a material of the first anti-mosaic layer includes semiconductors or conductors.

In an embodiment of the invention, each of the plurality of first stripe electrodes have a symmetrical shape or an unsymmetrical shape.

In an embodiment of the invention, each of the plurality of first stripe electrodes are straight line shaped or curved line shaped.

In an embodiment of the invention, each of the plurality of first stripe electrodes have the same shape or different shape.

In an embodiment of the invention, the plurality of first stripe electrodes are transparent electrodes, translucent electrodes or opaque electrodes.

Based on the above, in the electrically tunable optical phase modulation element of the invention, since the first anti-mosaic layer is disposed in between the first substrate and the liquid crystal layer or that the second anti-mosaic layer is disposed in between the second substrate and the liquid crystal layer, the electrical field generated by the stripe electrodes can be smoothened, and the grid like electrical field generated in conventional electrically tunable lens can be eliminated. As such, an optical phase change of the lens element can better imitate that of a normal lens, and a better lens image quality can be obtained.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
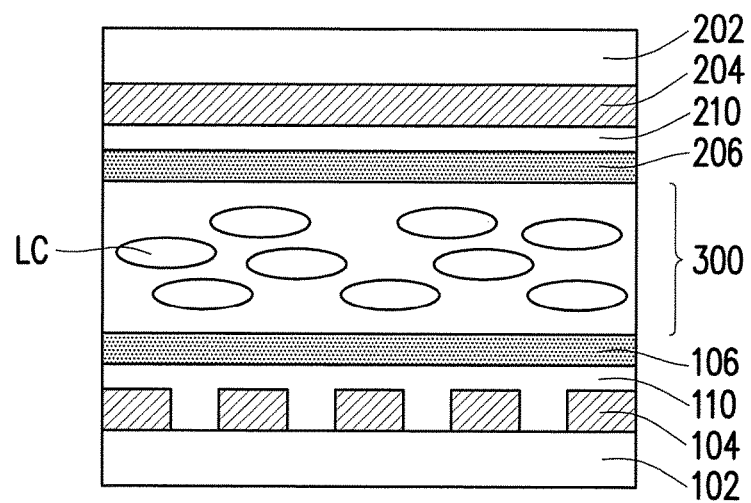
FIG. 1A is a schematic diagram showing an electrically tunable optical phase modulation element 100A according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic diagram showing an electrically tunable optical phase modulation element 100A according to an embodiment of the invention. Referring to FIG. 1A, an electrically tunable optical phase modulation element 100A of the embodiment may include a first substrate 102, a second substrate 202, a liquid crystal layer 300, a plurality of first stripe electrodes 104, a first anti-mosaic layer 106, a first insulating layer 110, a plurality of second stripe electrodes 204, a second anti-mosaic layer 206 and a second insulating layer 210.

In the current embodiment, the second substrate 202 is disposed opposite to the first substrate 102. The first substrate 102 and the second substrate 202 are made of a glass substrate or quartz, for example. In other embodiments, the first substrate 102 and the second substrate 202 may be a transparent substrate of other materials, such as a polymeric material. The liquid crystal layer 300 is disposed in between the first substrate 102 and the second substrate 202, and is adapted to have an effect of a lens in an optically active region. More specifically, an effective refractive index of the liquid crystal layer 300 at each different position will depend on the voltage applied, and through the control of the electrical field distribution, the liquid crystal layer 300 of the electrically tunable optical phase modulation element 100A may operate to have a lens effect in the optically active region. For example, by controlling the voltage distribution, an optical path of the liquid crystal 300 may be adjusted to be similar to a spherical general lens, a non-spherical general lens, a spherical Kinoform lens or a non-spherical Kinoform lens based on requirement. In an embodiment of the invention, a material of the liquid crystal layer 300 comprises cholesteric liquid crystals, polymer-dispersed liquid crystals, blue-phase liquid crystals or nematic liquid crystals. However, the present invention is not limited thereto, and other suitable liquid crystal materials may be used.

Figure 1B:
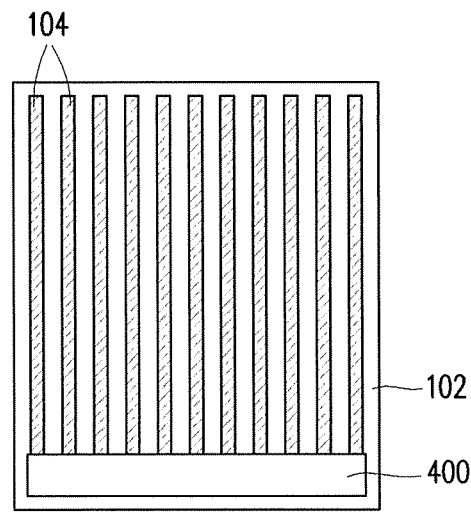
FIG. 1B is a schematic top view of a plurality of first stripe electrodes disposed on a first substrate according to an embodiment of the invention.

As shown in FIG. 1A, the plurality of first stripe electrodes 104 is disposed in between the first substrate 102 and the liquid crystal layer 300. The first stripe electrodes 104 are for example, transparent electrodes, translucent electrodes or opaque electrodes. The arrangement of the first stripe electrodes 104 can also be shown in FIG. 1B. FIG. 1B is a schematic top view of a plurality of first stripe electrodes disposed on a first substrate according to an embodiment of the invention. As shown in FIG. 1B, a controlling circuit 400 is provided, wherein the controlling circuit 400 is electrically connected to each of the first stripe electrodes 104. Furthermore, the voltage of each of the first stripe electrodes 104 is independently controlled through the controlling circuit 400. That is, each of the first stripe electrodes 104 may be supplied or driven with a different voltage.

Referring back to FIG. 1A, a first anti-mosaic layer 106 is disposed in between the first substrate 102 and the liquid crystal layer 300 and located above the first stripe electrodes 104. In addition, a first insulating layer 110 is disposed in between the first stripe electrodes 104 and the first anti-mosaic layer 106, such that the first stripe electrodes 104 and the first anti-mosaic layer 106 are electrically insulated from each other. In the present embodiment, a material of the first anti-mosaic layer 106 is semiconductors or conductors. Specifically, the semiconductor or conductor materials that may be used as the first anti-mosaic layer are such as oxide of titanium, zinc, tin, or indium. More preferably, the first anti-mosaic layer 106 is semiconductors that can achieve a better performance of the lens.

Figure 1C:
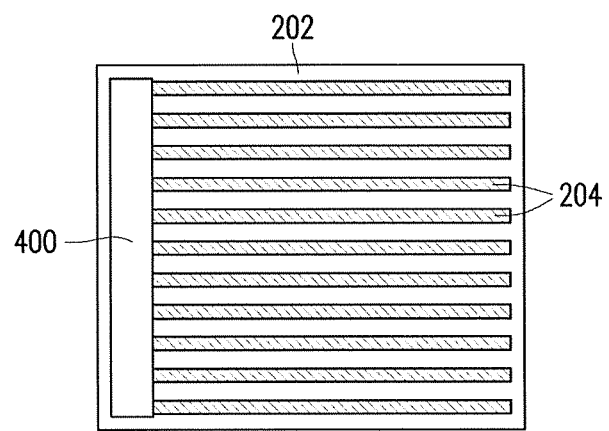
FIG. 1C is a schematic top view of a plurality of second stripe electrodes disposed on a second substrate according to an embodiment of the invention.

Furthermore, the plurality of second stripe electrodes 204 is disposed in between the second substrate 202 and the liquid crystal layer 300. The second stripe electrodes 204 are for example, transparent electrodes, translucent electrodes or opaque electrodes. The arrangement of the second stripe electrodes 204 can also be shown in FIG. 1C. FIG. 1C is a schematic top view of a plurality of second stripe electrodes disposed on a second substrate according to an embodiment of the invention. As shown in FIG. 1C, the controlling circuit 400 similar to the one shown in FIG. 1B is provided, wherein the controlling circuit 400 is electrically connected to each of the second stripe electrodes 204. Furthermore, the voltage of each of the second stripe electrodes 204 is independently controlled through the controlling circuit 400. That is, each of the second stripe electrodes 204 may be supplied or driven with a different voltage.

By referring to FIG. 1A to FIG. 1C, it should be noted that an extension direction of the first stripe electrodes 104 intersects with an extension direction of the second stripe electrodes 204. In the present embodiment, the first stripe electrodes 104 and the second stripe electrodes 204 are for example perpendicular to each other. However, the invention is not limited thereto, and the arrangement of the first stripe electrodes 104 and the second stripe electrodes 204 may be adjusted as long as they intersect each other.

Additionally, in the present embodiment, a second anti-mosaic layer 206 is disposed in between the second substrate 202 and the liquid crystal layer 300 and located above the second stripe electrodes 204. Moreover, a second insulating layer 210 is disposed in between the second stripe electrodes 204 and the second anti-mosaic layer 206, such that the second stripe electrodes 204 and the second anti-mosaic layer 206 are electrically insulated from each other. A material of the second anti-mosaic layer 206 is similar to the material of the first anti-mosaic layer 106, hence, its description will not be repeated herein.

In the embodiment shown in FIG. 1A to FIG. 1C, since the first anti-mosaic layer 106 is disposed in between the first substrate 102 and the liquid crystal layer 300, and that the second anti-mosaic layer 206 is disposed in between the second substrate 202 and the liquid crystal layer 300, the grid like electrical field generated by the first stripe electrodes 104 and the second stripe electrodes 204 can be eliminated and smoothened. As such, an optical phase change of the electrically tunable optical phase modulation element 100A can better imitate that of a normal lens, and a better lens image quality can be obtained.

Figure 2:
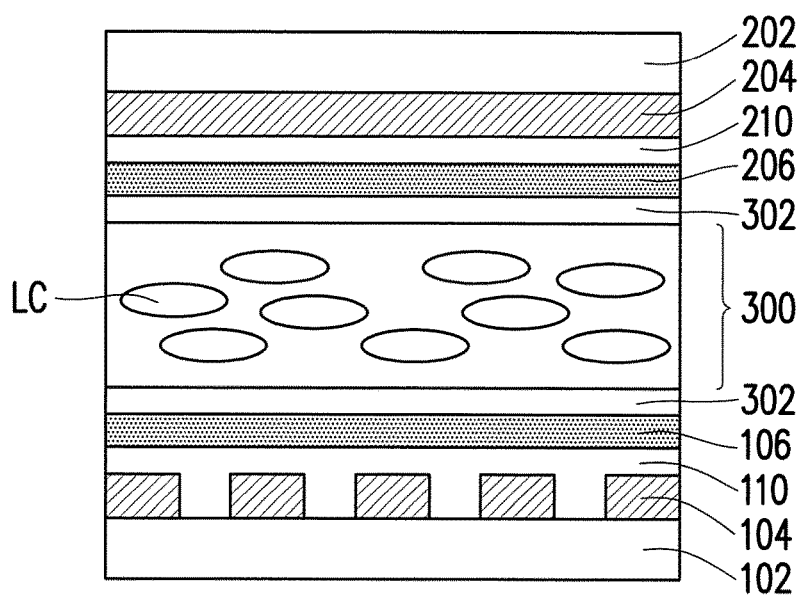
FIG. 2 is a schematic diagram showing an electrically tunable optical phase modulation element 100B according to another embodiment of the invention.

FIG. 2 is a schematic diagram showing an electrically tunable optical phase modulation element 100B according to another embodiment of the invention. The embodiment shown in FIG. 2 is similar to the embodiment shown in FIG. 1A to FIG. 1C, therefore the same reference numerals are used to denote the same or like parts, and its description will not be repeated herein. The difference between the embodiment shown in FIG. 2 and the embodiment shown in FIG. 1A to FIG. 1C is that the electrically tunable optical phase modulation element 100B further comprises alignment layers 302 disposed on two sides of the liquid crystal layer 300. The alignment layers 302 may be present or absent from the electrically tunable optical phase modulation element depending on the choice of the liquid crystal material used. In the present embodiment, the alignment layers 302 acts to align the liquid crystal molecules LC in the liquid crystal layer 300. In certain embodiments, a material of the alignment layer 302 may include, for example, polyimide (PI), methyl cellulose (MC), polymethylmethacrylate (PMMA), polyvinyl alcohol (PVA), polyamide, silicon oxide ($SiO_2$), silicon nitride, silicon carbonate, or aluminum oxide etc. However, the invention is not limited thereto, and other suitable materials for the alignment layers 302 may be used.

Similarly, in the embodiment shown in FIG. 2, since the first anti-mosaic layer 106 is disposed in between the first substrate 102 and the liquid crystal layer 300, and that the second anti-mosaic layer 206 is disposed in between the second substrate 202 and the liquid crystal layer 300, the grid like electrical field generated by the first stripe electrodes 104 and the second stripe electrodes 204 can be eliminated and smoothened. As such, an optical phase change of the electrically tunable optical phase modulation element 100B can better imitate that of a normal lens, and a better lens image quality can be obtained.

As may be noted in the embodiment shown in FIG. 1A to FIG. 1C, the width of each of the first stripe electrodes 104 and each of the second stripe electrodes 204 are equivalent, and the gap between each of these stripe electrodes (102/104) are also kept the same. However, the invention is not limited thereto, and the width of the stripe electrodes and the gap between the stripe electrodes may be adjusted according to requirement. Examples are presented in the embodiments shown in FIG. 3A and FIG. 3B.

Figure 3A:
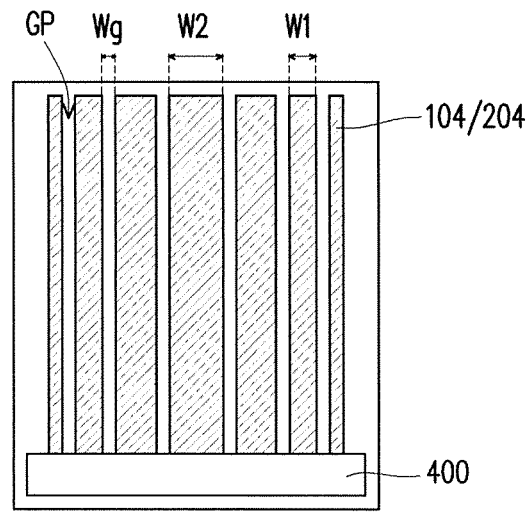
FIG. 3A is a schematic top view of a plurality stripe electrodes disposed on a substrate according to an embodiment of the invention.

FIG. 3A is a schematic top view of a plurality stripe electrodes disposed on a substrate according to an embodiment of the invention. In the example shown in FIG. 3A, the stripe electrodes (first stripe electrodes 104 or second stripe electrodes 204) may have a different width. For instance, one of the stripe electrodes (104/204) may have a width W1, while another one of the stripe electrodes (104/204) may have a width W2, wherein W2 is greater than W1. More specifically, some of the stripe electrodes (104/204) may be adjusted to have the same width, while some other stripe electrodes (104/204) may be adjusted to have a smaller or larger width. In the embodiment shown in FIG. 3A, a width Wg of the gap GP between each of the stripe electrodes (104/204) is still kept equivalent. However, the invention is not limited thereto and the width of the gap GP may be adjusted based on requirement.

Figure 3B:
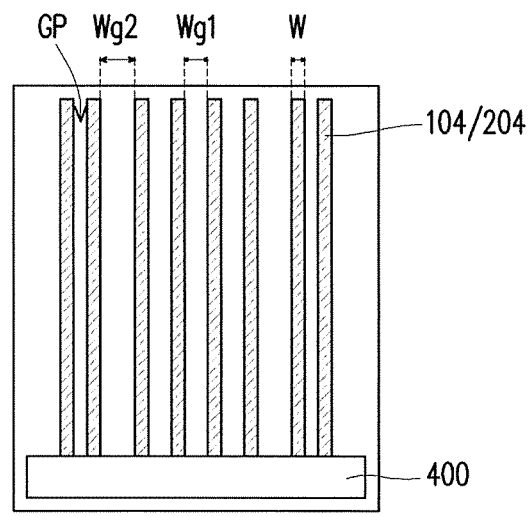
FIG. 3B is a schematic top view of a plurality stripe electrodes disposed on a substrate according to another embodiment of the invention.

FIG. 3B is a schematic top view of a plurality stripe electrodes disposed on a substrate according to another embodiment of the invention. In the example shown in FIG. 3B, each of the stripe electrodes (104/204) have the same width W, however, a width of the gap GP between each of the stripe electrodes (104/204) is adjusted. For instance, a width Wg1 between two of the stripe electrodes (104/204) may be smaller than a width Wg2 between another two of the stripe electrodes (104/204). Alternatively, the width between two of the stripe electrodes (104/204) may be adjusted to be larger, identical or smaller than another two stripe electrodes (104/204) based on requirement.

Figure 4A:
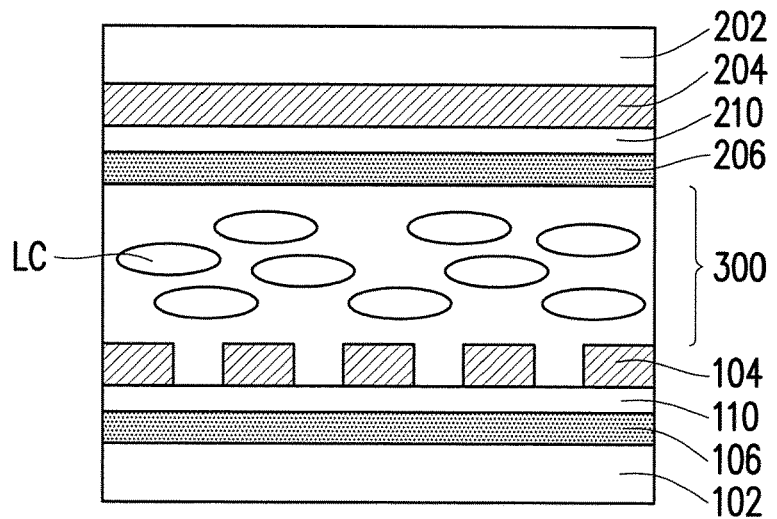
FIG. 4A is a schematic diagram showing an electrically tunable optical phase modulation element 100C according to another embodiment of the invention.

FIG. 4A is a schematic diagram showing an electrically tunable optical phase modulation element 100C according to another embodiment of the invention. The embodiment shown in FIG. 4A is similar to the embodiment shown in FIG. 1A to FIG. 1C, therefore the same reference numerals are used to denote the same or like parts, and its description will not be repeated herein. The difference between the embodiment shown in FIG. 4A and the embodiment shown in FIG. 1A to FIG. 1C is in the arrangement of the layers. Referring to FIG. 1A the first anti-mosaic layer 106 is disposed in between the first stripe electrodes 104 and the liquid crystal layer 300. However, in FIG. 4A, the first anti-mosaic layer 106 is disposed in between the first substrate 102 and the first stripe electrodes 104. That is, the first stripe electrode 104 is disposed above the first anti-mosaic layer 106. However, the arrangement of the layers of the second stripe electrodes 204 and the second anti-mosaic layer 206 on the second substrate 202 is still kept the same as in FIG. 1A.

Figure 4B:
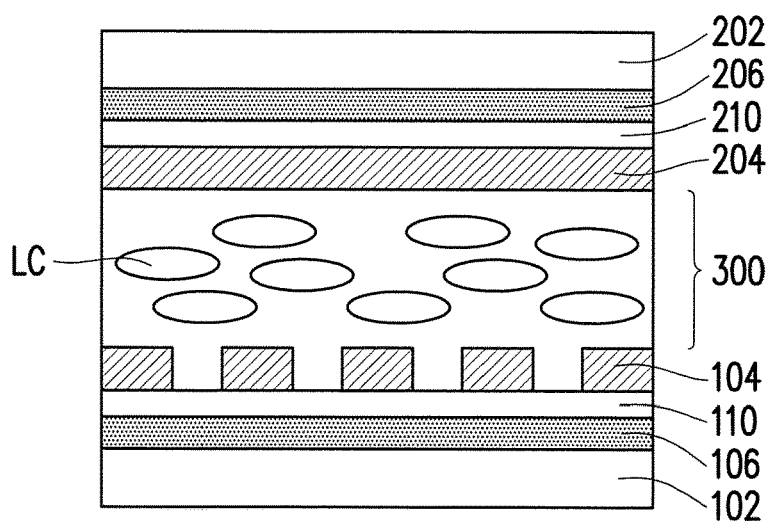
FIG. 4B is a schematic diagram showing an electrically tunable optical phase modulation element 100D according to another embodiment of the invention.

FIG. 4B is a schematic diagram showing an electrically tunable optical phase modulation element 100D according to another embodiment of the invention. The embodiment shown in FIG. 4B is similar to the embodiment shown in FIG. 4A, therefore the same reference numerals are used to denote the same or like parts, and its description will not be repeated herein. The difference between the embodiment shown in FIG. 4A and the embodiment shown in FIG. 4B is in the arrangement of the layers. As shown in FIG. 4B, the arrangement of the layers of the first stripe electrodes 104 and the first anti-mosaic layer 106 on the first substrate 102 is kept the same as in FIG. 4A. However, on the second substrate 202 in FIG. 4B, the layers are rearranged so that the second anti-mosaic layer 206 is disposed in between the second substrate 202 and the second stripe electrodes 204.

Figure 4C:
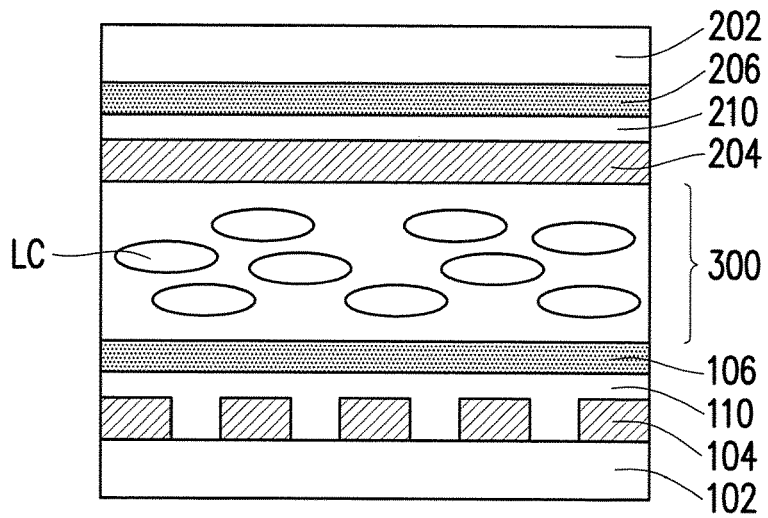
FIG. 4C is a schematic diagram showing an electrically tunable optical phase modulation element 100E according to another embodiment of the invention.

FIG. 4C is a schematic diagram showing an electrically tunable optical phase modulation element 100E according to another embodiment of the invention. The embodiment shown in FIG. 4C is similar to the embodiment shown in FIG. 4B, therefore the same reference numerals are used to denote the same or like parts, and its description will not be repeated herein. The difference between the embodiment shown as FIG. 4B and the embodiment shown in FIG. 4C is in the arrangement of the layers. As shown in FIG. 4C, the arrangement of the layers of the second stripe electrodes 204 and the second anti-mosaic layer 206 on the second substrate 202 is still kept the same as in FIG. 4B. However, on the first substrate 102 in FIG. 4C, the layers are rearranged so that the first anti-mosaic layer 106 is disposed in between the first stripe electrodes 104 and the liquid crystal layer 300.

Figure 4D:
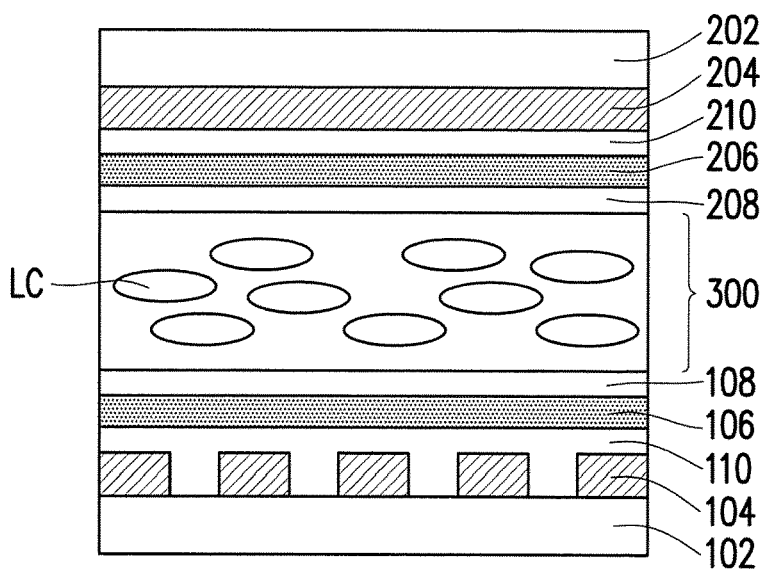
FIG. 4D is a schematic diagram showing an electrically tunable optical phase modulation element 100F according to another embodiment of the invention.

FIG. 4D is a schematic diagram showing an electrically tunable optical phase modulation element 100F according to another embodiment of the invention. The embodiment shown in FIG. 4D is similar to the embodiment shown in FIG. 1A to FIG. 1C, therefore the same reference numerals are used to denote the same or like parts, and its description will not be repeated herein. The difference between the embodiment shown in FIG. 4D and the embodiment shown in FIG. 1A to FIG. 1C is that the electrically tunable optical phase modulation element 100F further comprises protection layer 108 and protection layer 208. More specifically, when the first anti-mosaic layer 106 is disposed in between the first stripe electrodes 104 and the liquid crystal layer 300, the electrically tunable optical phase modulation element 100F may further comprise a protection layer 108 disposed in between the first anti-mosaic layer 106 and the liquid crystal layer 300. In a similar way, when the second anti-mosaic layer 206 is disposed in between the plurality of second stripe electrodes 204 and the liquid crystal layer 300, the electrically tunable optical phase modulation element 100F may further comprise a protection layer 208 disposed in between the second anti-mosaic layer 206 and the liquid crystal layer 300. The protection layers (108/208) serve to protect the first anti-mosaic layer 106 and the second anti-mosaic layer 206 from the liquid crystal layer 300.

In the embodiments shown in FIG. 4A to FIG. 4D above, it can be known that the arrangement of the layers of the stripe electrodes and the anti-mosaic layers on different substrates can be adjusted based on requirement. Similarly, in the embodiment shown in FIG. 4A to FIG. 4D, since the first anti-mosaic layer 106 is disposed in between the first substrate 102 and the liquid crystal layer 300, and that the second anti-mosaic layer 206 is disposed in between the second substrate 202 and the liquid crystal layer 300, the grid like electrical field generated by the first stripe electrodes 104 and the second stripe electrodes 204 can be eliminated and smoothened. As such, an optical phase change of the electrically tunable optical phase modulation elements 100C, 100D, 100E and 100F can better imitate that of a normal lens, and a better lens image quality can be obtained.

Figure 5A:
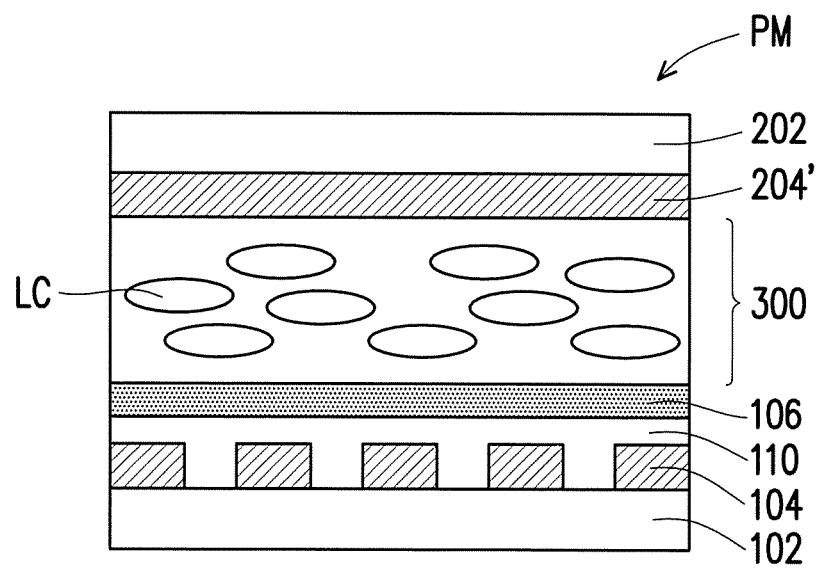
FIG. 5A is a schematic diagram showing an electrically tunable optical phase modulation element 200A according to another embodiment of the invention.

FIG. 5A is a schematic diagram showing an electrically tunable optical phase modulation element 200A according to another embodiment of the invention. The embodiment shown in FIG. 5A is similar to the embodiment shown in FIG. 1A to FIG. 1C, therefore the same reference numerals are used to denote the same or like parts, and its description will not be repeated herein. The difference between the embodiment shown in FIG. 5A and the embodiment shown in FIG. 1A to FIG. 1C is that in the electrically tunable optical phase modulation 200A, only a second conductive layer 204' is disposed in between the second substrate 202 and the liquid crystal layer 300. The second conductive layer 204' is an entire layer that covers the second substrate 202. In the present embodiment, the electrically tunable optical phase modulation element 200A may be treated as one phase modulator PM. In such phase modulator PM, an optical phase distribution in the optically active region may include a distribution of quadratic curve, spherical curve, cylindrical lens arrays, or prism. Through the stacking of two of these phase modulators PM, an optical phase distribution formed by the combination of these phase modulator PM may include a distribution of spherical lens, non-spherical lens, cylindrical lens, lens arrays, and prism.

Figure 5B:
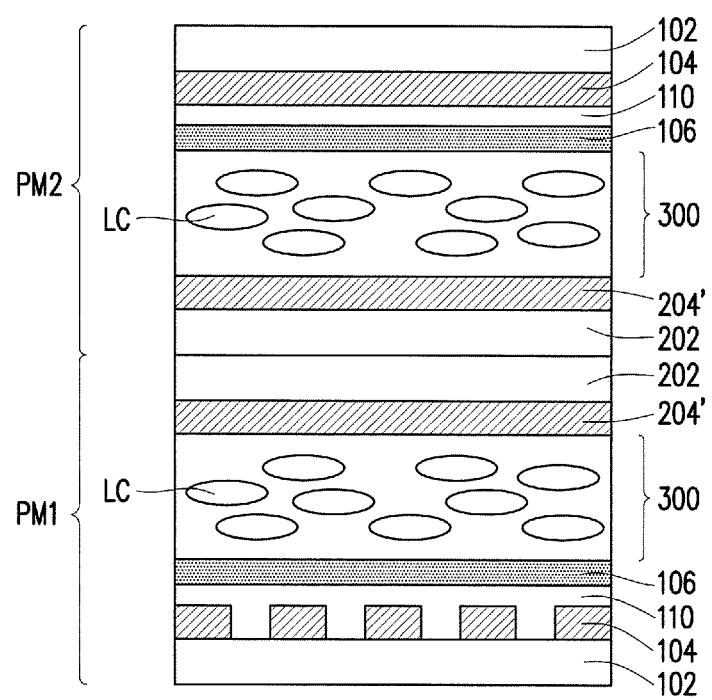
FIG. 5B is a schematic diagram showing an electrically tunable optical phase modulation element 200B with stacked phase modulators according to another embodiment of the invention.

FIG. 5B is a schematic diagram showing an electrically tunable optical phase modulation element 200B with stacked phase modulators according to another embodiment of the invention. As shown in FIG. 5B, the electrically tunable optical phase modulation element 200B is formed by the stacking of two phase modulators (first phase modulator PM1 and second phase modulator PM2). The first phase modulator PM1 and the second phase modulator PM2 of FIG. 5B are the same as the phase modulator PM shown in FIG. 5A, therefore the same reference numerals are used to denote the same or like parts, and its description will not be repeated herein. In the present embodiment, the second phase modulator PM2 is stacked on top of the first phase modulator PM1. In particular, the second substrate 202 of the second phase modulator PM2 is stacked on the second substrate 202 of the first phase modulator PM1. That is, the second substrate 202 of the second phase modulator PM2 and the second substrate 202 of the first phase modulator PM1 are in contact with each other.

In addition, in the present embodiment, an extension direction of the plurality of first stripe electrodes 104 of the first phase modulator PM1 intersects with an extension direction of the plurality of first stripe electrodes 104 of the second phase modulator PM2. That is, the two first stripe electrodes 104 of the present embodiment will have an arrangement similar to the first stripe electrodes 104 and the second stripe electrodes 204, which intersects each other as shown in FIG. 1B and FIG. 1C. In particular, as shown in FIG. 5B, the first stripe electrodes 104 of the first phase modulator PM1 and the second phase modulator PM2 are for example perpendicular to each other. However, the invention is not limited thereto, and the arrangement of the first stripe electrodes 104 on the two phase modulators (PM1/PM2) may be adjusted as long as they intersect each other. The optical phase distribution formed by the combination of the first phase modulator PM1 and the second phase modulator PM2 may include a distribution of spherical lens, non-spherical lens, cylindrical lens, lens arrays, and prism.

Figure 5C:
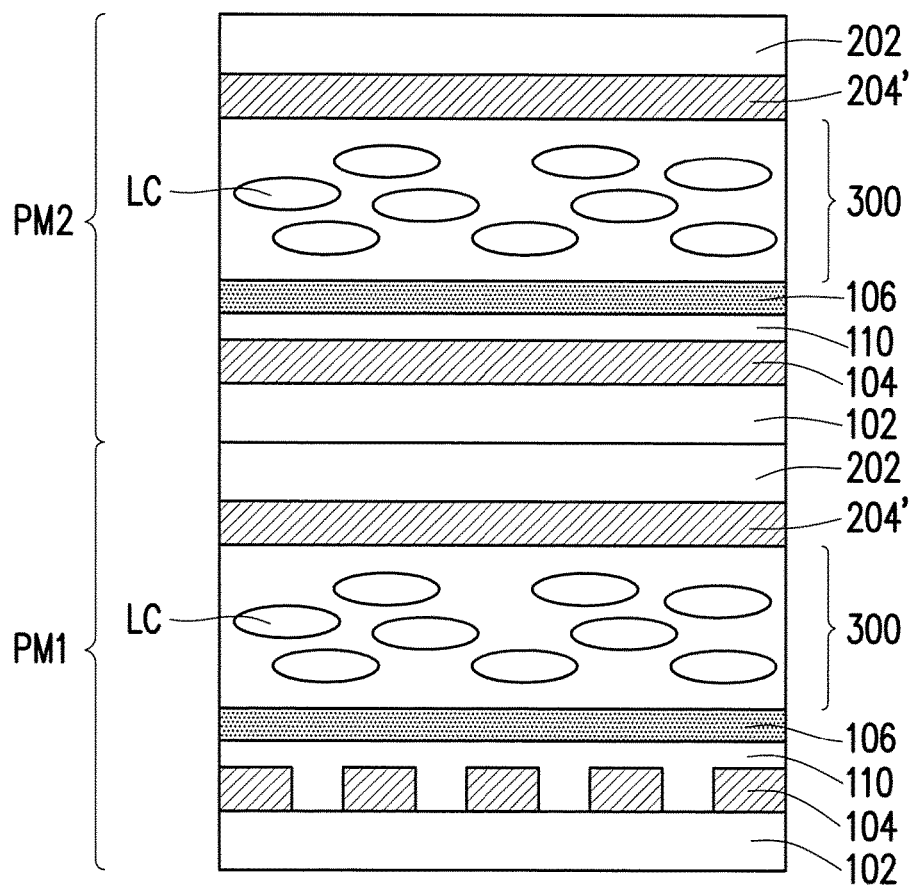
FIG. 5C is a schematic diagram showing an electrically tunable optical phase modulation element 200C with stacked phase modulators according to another embodiment of the invention.

FIG. 5C is a schematic diagram showing an electrically tunable optical phase modulation element 200C with stacked phase modulators according to another embodiment of the invention. The embodiment shown in FIG. 5C is similar to the embodiment shown in 5B, therefore the same reference numerals are used to denote the same or like parts, and its description will not be repeated herein. The difference between the embodiment shown in FIG. 5C and the embodiment shown in FIG.5B is in the way of stacking the first phase modulator PM1 and the second phase modulator PM2. In the present embodiment, the second phase modulator PM2 is stacked on top of the first phase modulator PM1. In particular, the first substrate 102 of the second phase modulator PM2 is stacked on the second substrate 202 of the first phase modulator PM1. That is, the first substrate 102 of the second phase modulator PM2 and the second substrate 202 of the first phase modulator PM1 are in contact with each other.

Similarly, in the electrically tunable optical phase modulation element 200C shown in FIG. 5C, an extension direction of the plurality of first stripe electrodes 104 of the first phase modulator PM1 intersects with an extension direction of the plurality of first stripe electrodes 104 of the second phase modulator PM2. Furthermore, the optical phase distribution formed by the combination of the first phase modulator PM1 and the second phase modulator PM2 may include a distribution of spherical lens, non-spherical lens, cylindrical lens, lens arrays, and prism.

Figure 5D:
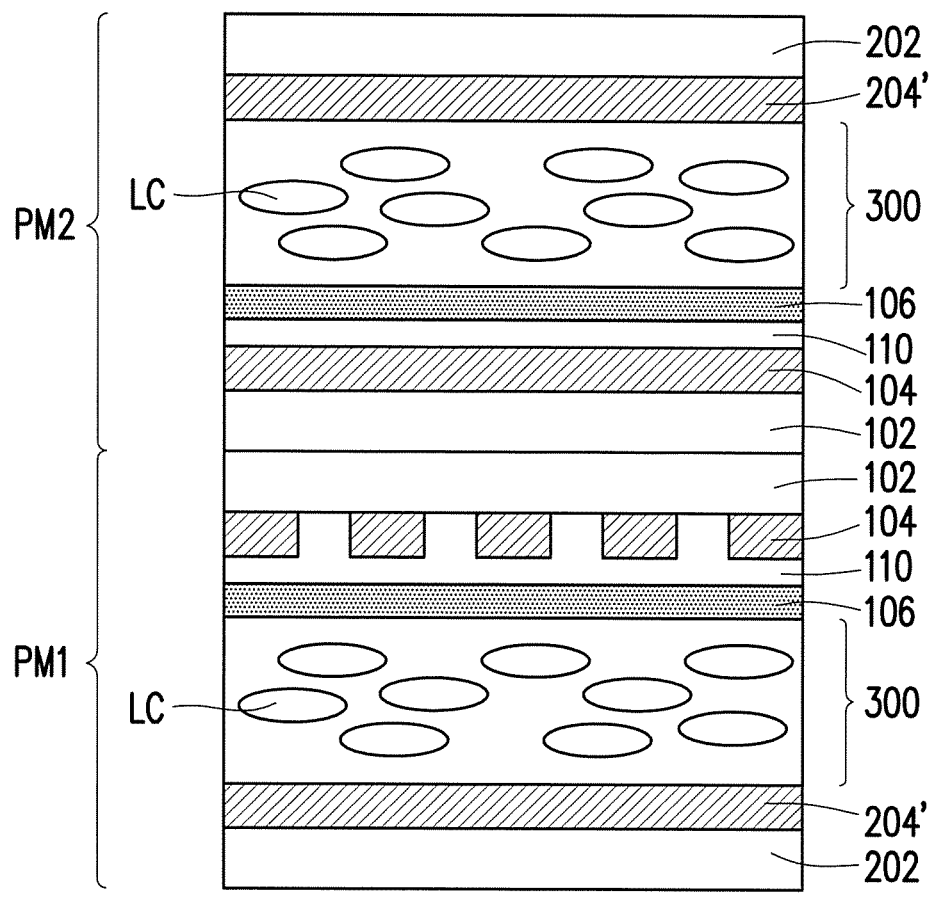
FIG. 5D is a schematic diagram showing an electrically tunable optical phase modulation element 200D with stacked phase modulators according to another embodiment of the invention.

FIG. 5D is a schematic diagram showing an electrically tunable optical phase modulation element 200D with stacked phase modulators according to another embodiment of the invention. The embodiment shown in FIG. 5D is similar to the embodiment shown in 5B, therefore the same reference numerals are used to denote the same or like parts, and its description will not be repeated herein. The difference between the embodiment shown in FIG. 5D and the embodiment shown in FIG.5B is in the way of stacking the first phase modulator PM1 and the second phase modulator PM2. In the present embodiment, the second phase modulator PM2 is stacked on top of the first phase modulator PM1. In particular, the first substrate 102 of the second phase modulator PM2 is stacked on the first substrate 102 of the first phase modulator PM1. That is, the first substrate 102 of the second phase modulator PM2 and the first substrate 102 of the first phase modulator PM1 are in contact with each other.

Similarly, in the electrically tunable optical phase modulation element 200D shown in FIG. 5D, an extension direction of the plurality of first stripe electrodes 104 of the first phase modulator PM1 intersects with an extension direction of the plurality of first stripe electrodes 104 of the second phase modulator PM2. Furthermore, the optical phase distribution formed by the combination of the first phase modulator PM1 and the second phase modulator PM2 may include a distribution of spherical lens, non-spherical lens, cylindrical lens, lens arrays, and prism.

In the embodiments shown in FIG. 5A to FIG. 5D above, it can be known that the arrangement of the layers of the stripe electrodes and the anti-mosaic layers on the first substrate 102 can be adjusted based on requirement. Similarly, in the embodiment shown in FIG. 5A to FIG. 5D, since the first anti-mosaic layer 106 is disposed in between the first substrate 102 and the liquid crystal layer 300 in each of the phase modulators (PM/PM1/PM2), the grid like electrical field generated by the first stripe electrodes 104 can be eliminated and smoothened. As such, an optical phase change of the electrically tunable optical phase modulation element 200A, 200B, 200C and 200D can better imitate that of a normal lens, and a better lens image quality can be obtained.

As may be noted in the embodiment shown in FIG. 1A to FIG. 1C, the first anti-mosaic layer 106 and the second anti-mosaic layer 206 are single anti-mosaic layers that cover the optically active region entirely. However, the invention is not limited thereto, and in other embodiments, the first anti-mosaic layer 106 and the second anti-mosaic layer 206 may be modified into stripe form. Examples are presented in the embodiments shown in FIG. 6A to FIG. 6D.

Figure 6A:
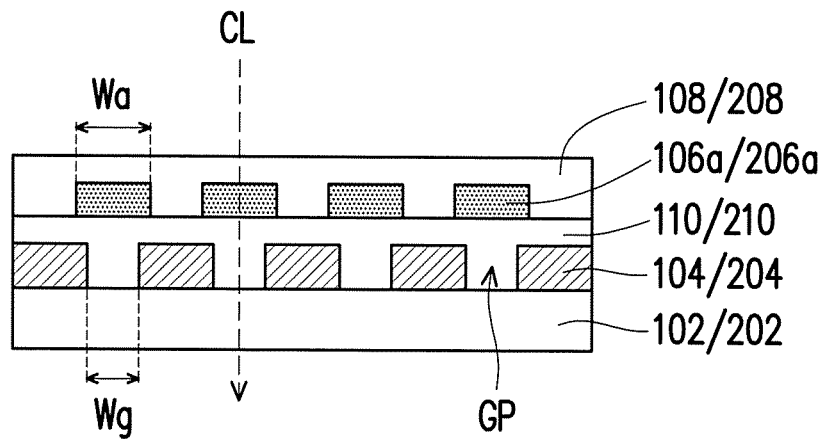
FIG. 6A is a schematic diagram showing the arrangement of an anti-mosaic layer and a plurality of stripe electrodes disposed on a substrate according to an embodiment of the invention.

FIG. 6A is a schematic diagram showing the arrangement of an anti-mosaic layer and a plurality of stripe electrodes disposed on a substrate according to an embodiment of the invention. In the embodiment of FIG. 6A, the first anti-mosaic layer 106 or the second anti-mosaic layer 206 may comprise first anti-mosaic stripes 106a and second anti-mosaic stripes 206a arranged in an array in the optically active region. In the current embodiment, a width Wa of the anti-mosaic stripes (106a/206a) is larger than a width Wg of a gap GP between each of the stripe electrodes (104/204). Additionally, a center line CL of the anti-mosaic stripes (106a/206a) is aligned with a center line CL of a gap GP between each of the stripe electrodes (104/204). That is, the anti-mosaic stripes (106a/206a) cover the gap GP between each of the stripe electrodes (104/204).

Figure 6B:
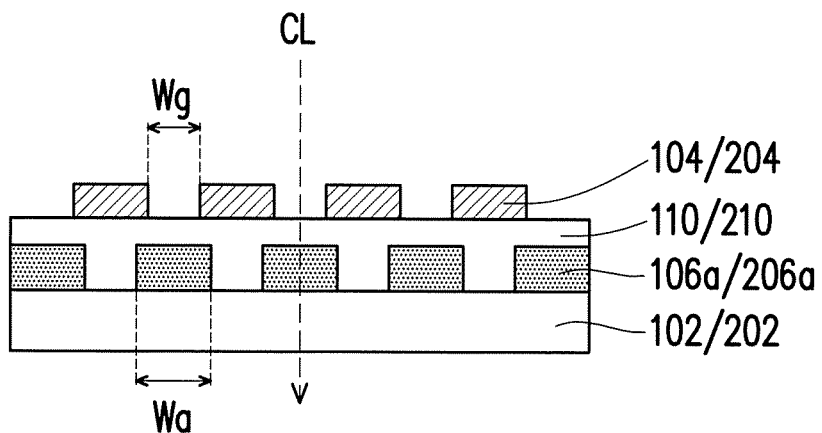
FIG. 6B is a schematic diagram showing the arrangement of an anti-mosaic layer and a plurality of stripe electrodes disposed on a substrate according to another embodiment of the invention.

FIG. 6B is a schematic diagram showing the arrangement of an anti-mosaic layer and a plurality of stripe electrodes disposed on a substrate according to another embodiment of the invention. The embodiment shown in FIG. 6B is similar to the embodiment shown in FIG. 6A, the same reference numerals are used to denote the same or like parts, and its description will not be repeated herein. The difference between the embodiment of FIG. 6A and the embodiment of FIG. 6B is in the arrangement of the layers. More specifically, in FIG. 6A, the anti-mosaic stripes (106a/206a) are located above the stripe electrodes (104/204) with the insulating layer (110/210) sandwiched therebetween, and the protection layer (108/208) covers the anti-mosaic stripes (106a/206a). Alternatively, in FIG. 6B, the anti-mosaic stripes (106a/206a) are located below the stripe electrodes (104/204) with the insulating layer (110/210) sandwiched therebetween, wherein no protection layer (108/208) is disposed.

Figure 6C:
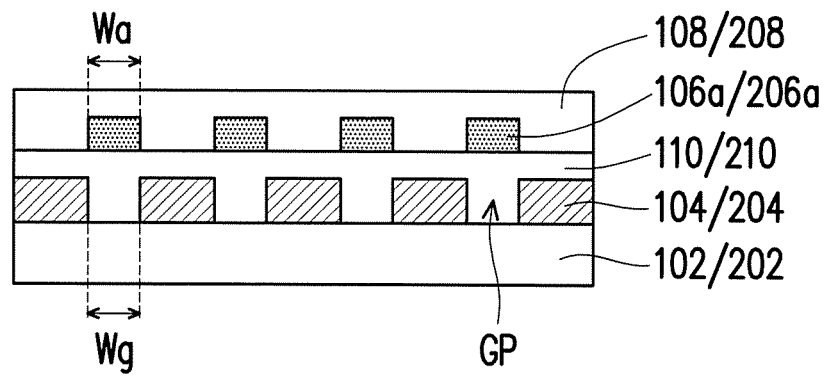
FIG. 6C is a schematic diagram showing the arrangement of an anti-mosaic layer and a plurality of stripe electrodes disposed on a substrate according to another embodiment of the invention.

FIG. 6C is a schematic diagram showing the arrangement of an anti-mosaic layer and a plurality of stripe electrodes disposed on a substrate according to another embodiment of the invention. The embodiment shown in FIG. 6C is similar to the embodiment shown in FIG. 6A, the same reference numerals are used to denote the same or like parts, and its description will not be repeated herein. The difference between the embodiment of FIG. 6A and the embodiment of FIG. 6C is that the width Wa of the anti-mosaic stripes (106a/206a) is equal to the width Wg of the gap GP between each of the stripe electrodes (104/204) in FIG. 6C. Note that in the current embodiment, a width Wa of the anti-mosaic stripes (106a/206a) cannot be smaller than a width Wg of the gap GP between the stripe electrodes (104/204). Instead, it is a requirement that the width Wa of the anti-mosaic stripes (106a/206a) is at least equal to or larger than the width Wg of the gap GP between the stripe electrodes (104/204).

Figure 6D:
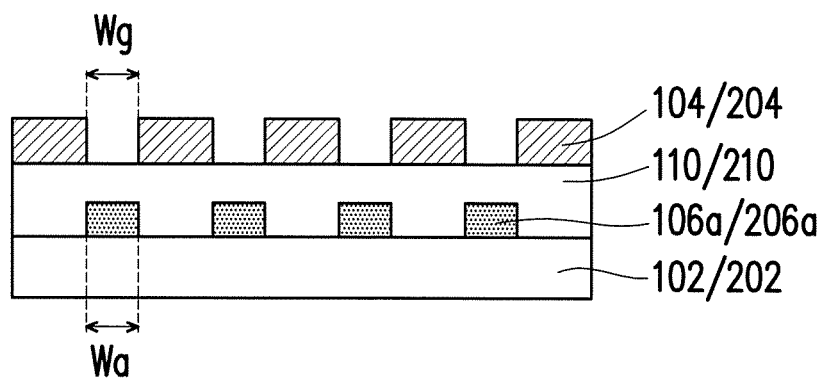
FIG. 6D is a schematic diagram showing the arrangement of an anti-mosaic layer and a plurality of stripe electrodes disposed on a substrate according to another embodiment of the invention.

FIG. 6D is a schematic diagram showing the arrangement of an anti-mosaic layer and a plurality of stripe electrodes disposed on a substrate according to another embodiment of the invention. The embodiment shown in FIG. 6D is similar to the embodiment shown in FIG. 6C, therefore the same reference numerals are used to denote the same or like parts, and its description will not be repeated herein. The difference between the embodiment of FIG. 6C and the embodiment of FIG. 6D is in the arrangement of the layers. More specifically, in FIG. 6C, the anti-mosaic stripes (106a/206a) are located above the stripe electrodes (104/204) with the insulating layer (110/210) sandwiched therebetween, and the protection layer (108/208) covers the anti-mosaic stripes (106a/206a). Alternatively, in FIG. 6D, the anti-mosaic stripes (106a/206a) are located below the stripe electrodes (104/204) with the insulating layer (110/210) sandwiched therebetween, wherein no protection layer (108/208) is disposed. Similarly, in FIG. 6D, anti-mosaic stripes (106a/206a) are arranged so that its width Wa is at least equal to a width Wg of the stripe electrodes (104/204).

It can be known in the embodiments shown in FIG. 6A to FIG. 6D that the anti-mosaic layers (106/206) may adopt a stripe conformation such that the anti-mosaic stripes (106a/206a) have a width that is at least equal to a width of a gap GP between the stripe electrodes (104/204). Similarly, in the embodiments of FIG. 6A to FIG. 6D, since the first anti-mosaic stripes 106a is disposed in between the first substrate 102 and the liquid crystal layer 300, and that the second anti-mosaic stripes 206a is disposed in between the second substrate 202 and the liquid crystal layer 300, the grid like electrical field generated by the first stripe electrodes 104 and the second stripe electrodes 204 can be eliminated and smoothened. As such, an optical phase change of the electrically tunable optical phase modulation element having the anti-mosaic stripes (106a/206a) can better imitate that of a normal lens, and a better lens image quality can be obtained.

Figure 7:
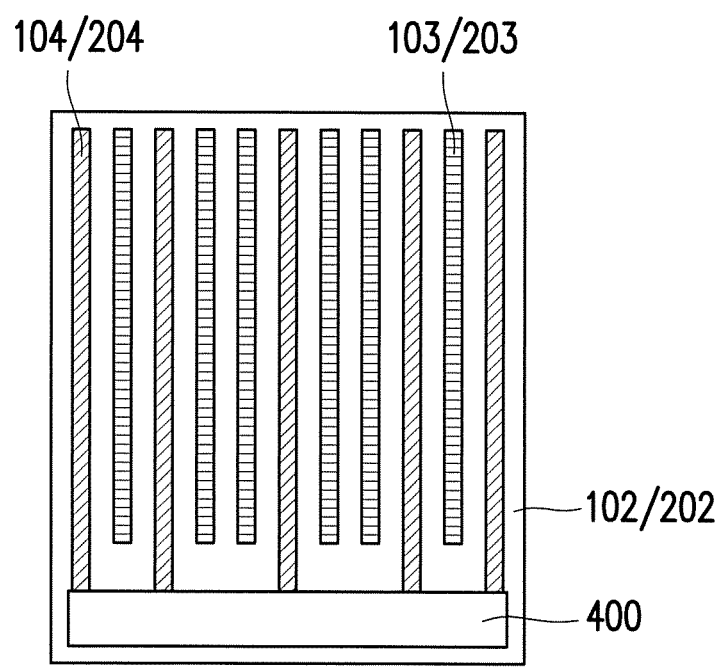
FIG. 7 is a schematic top view of a plurality of stripe electrodes and dummy electrodes disposed on a substrate according to an embodiment of the invention.

FIG. 7 is a schematic top view of a plurality of stripe electrodes and dummy electrodes disposed on a substrate according to an embodiment of the invention. The embodiment shown in FIG. 7 is similar to the embodiment shown in FIG. 1B and FIG. 1C, therefore the same reference numerals are used to denote the same or like parts, and its description will not be repeated herein. The difference between the embodiment shown in FIG. 7 and the embodiment shown in FIG. 1B and FIG. 1C is that the electrically tunable optical phase modulation element further comprises first dummy electrodes 103 that are disposed adjacent to the first stripe electrodes 104 or second dummy electrodes 203 that are disposed adjacent to the second stripe electrodes 204. In the present embodiment, first dummy electrodes 103 and the second dummy electrodes 203 are floating electrodes that are not connected to the controlling circuit 400. In certain embodiments, in order to avoid the excessive use of stripe electrodes and to reduce the cost of the controlling circuit of the electrically tunable lens, a plurality of dummy electrodes (103/203) may be disposed adjacent to the stripe electrodes (104/204) to enhance coupling.

In the embodiments shown in FIG. 1A to FIG. 7, all of the first stripe electrodes 104 and the second stripe electrodes 204 are straight line shaped electrodes. However, the present invention is not limited thereto, and the shape design of the first stripe electrodes 104 and the second stripe electrodes 204 can be modified based on requirements. Examples of modified stripe electrodes are shown in the embodiments of FIG. 8A to FIG. 8C.

Figure 8A:
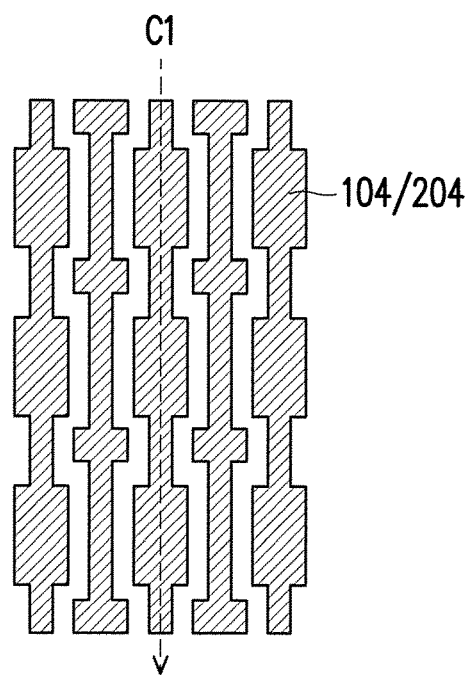
FIG. 8A is a schematic top view of a plurality of stripe electrodes with a modified shape according to an embodiment of the invention.

FIG. 8A is a schematic top view of a plurality of stripe electrodes with a modified shape according to an embodiment of the invention. Referring to FIG. 8A, the stripe electrodes (104/204) are not straight line shaped electrodes but each have a symmetrical shape. In the present embodiment, the stripe electrodes (104/204) are referred as "symmetrical" when based on a center line C1 of the stripe electrodes (104/204), the left portion is a direct mirror image to the right portion of the stripe electrodes (104/204).

Figure 8B:
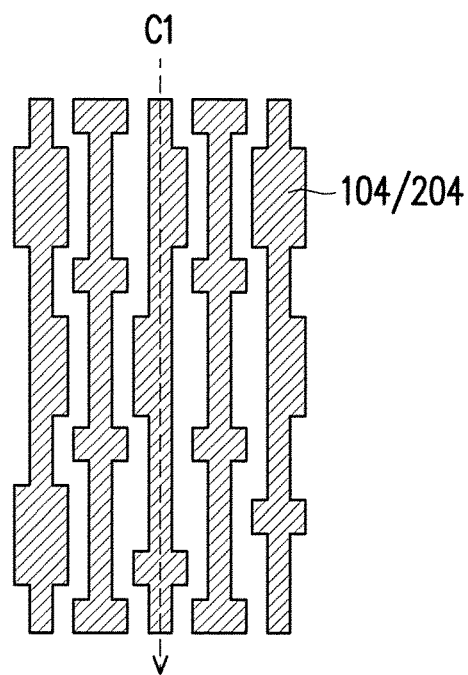
FIG. 8B is a schematic top view of a plurality of stripe electrodes with a modified shape according to another embodiment of the invention.

FIG. 8B is a schematic top view of a plurality of stripe electrodes with a modified shape according to another embodiment of the invention. Referring to FIG. 8B, the stripe electrodes (104/204) are not straight line shaped electrodes, and have an unsymmetrical shape. In the present embodiment, the stripe electrodes (104/204) are referred as "unsymmetrical" when based on a center line C1 of the stripe electrodes (104/204), the left portion of the stripe electrodes (104/204) have a different shape with the right portion of the stripe electrodes (104/204).

Figure 8C:
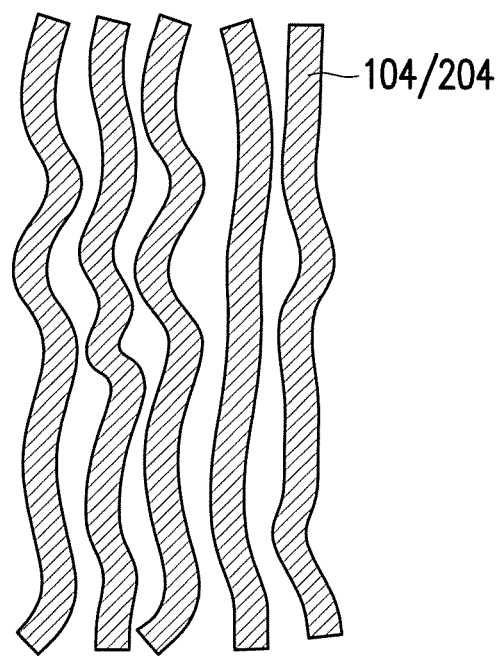
FIG. 8C is a schematic top view of a plurality of stripe electrodes with a modified shape according to another embodiment of the invention.

FIG. 8C is a schematic top view of a plurality of stripe electrodes with a modified shape according to another embodiment of the invention. Referring to FIG. 8C, the stripe electrodes (104/204) are not straight line shaped electrodes but are curved line shaped electrodes.

Based on the embodiments shown in FIG. 8A to FIG. 8C, it can be known that the shape of the stripe electrodes (104/204) are not particularly limited. For instance, each of the first stripe electrodes 104 may have the same shape or different shape and each of the second stripe electrodes 204 may have the same shape or different shape based on requirement. In addition, by referring to the embodiments from FIG. 1A to FIG. 8C, it should be noted that an arrangement of the first stripe electrodes 104 can be the same or different to an arrangement of the second stripe electrodes 204. For example, when the first stripe electrodes 104 adopt a straight line shape, it is not necessary for the second stripe electrodes 204 to adopt the same straight line shape. Instead, the second stripe electrodes 204 can each be modified to adopt straight line shaped, curved line shaped, and be symmetrical or unsymmetrical based on design requirements.

EXPERIMENTAL EXAMPLE

The following experimental example are performed to prove that the electrically tunable optical phase modulation element of the invention can be used to achieve the effect of eliminating and smoothening the grid like electrical field generated by the stripe electrodes, and to obtain better lens image quality.

Specifically, a conventional electrically tunable optical phase modulation element without the anti-mosaic layers and an electrically tunable optical phase modulation element 100A having the anti-mosaic layer (106/206) according to FIG. 1A of the invention is provided and their electric potential was simulated and compared.

Figure 9A:
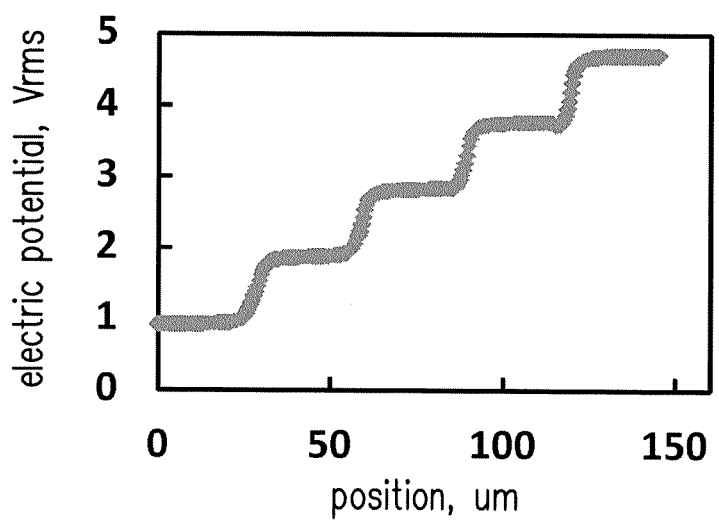
FIG. 9A is an electric potential simulation result of a conventional electrically tunable optical phase modulation element without an anti-mosaic layer according to an experimental example of the invention.
Figure 9B:
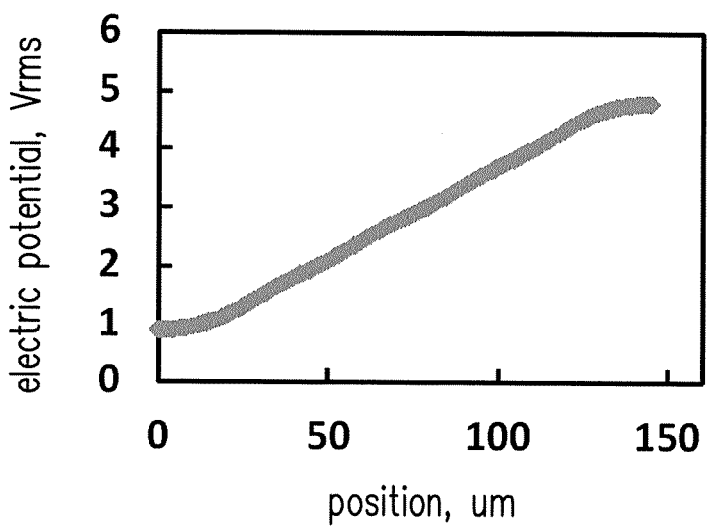
FIG. 9B is an electric potential simulation result of an electrically tunable optical phase modulation element having an anti-mosaic layer according to an experimental example of the invention.

FIG. 9A is an electric potential simulation result of a conventional electrically tunable optical phase modulation element without anti-mosaic layer according to an experimental example of the invention. FIG. 9B is an electric potential simulation result of an electrically tunable optical phase modulation element having anti-mosaic layer according to an experimental example of the invention. As shown in FIG. 9A, when the electrically tunable optical phase modulation element does not contain the anti-mosaic layer, the electric potential cross liquid crystal layers is changed step by step in a ladder shape form. That is, the conventional electrically tunable optical phase modulation element without the anti-mosaic layers may generate a grid like optical phase difference that affects the quality of the lens. In comparison, as shown in FIG. 9B, when the electrically tunable optical phase modulation element 100A having an anti-mosaic layer (106/206) according to FIG. 1A of the invention is used, the change of electric potential cross liquid crystal layers is smoothened and the grid like optical phase difference can be eliminated.

In summary, in the electrically tunable optical phase modulation element of the present disclosure, since the first anti-mosaic layer is disposed in between the first substrate and the liquid crystal layer, and that the second anti-mosaic layer is disposed in between the second substrate and the liquid crystal layer, the grid like electrical field generated by the first stripe electrodes and the second stripe electrodes can be eliminated and smoothened. As such, an optical phase change of the electrically tunable optical phase modulation element can better imitate that of a normal lens, and a better lens imaging quality can be obtained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An electrically tunable optical phase modulation element, comprising:
    a first substrate;
    a second substrate, disposed opposite to the first substrate;
    a liquid crystal layer, disposed in between the first substrate and the second substrate, wherein the liquid crystal layer is adapted to have an effect of an optical phase modulation in an optically active region;
    a plurality of first stripe electrodes, disposed in between the first substrate and the liquid crystal layer, wherein a voltage of each of the plurality of first stripe electrodes is independently controlled;
    a first anti-mosaic layer, disposed in between the first substrate and the liquid crystal layer;
    a first insulating layer, disposed in between the plurality of first stripe electrodes and the first anti-mosaic layer, such that the plurality of first stripe electrodes and the first anti-mosaic layer are electrically insulated from each other;
    a plurality of second stripe electrodes, disposed in between the second substrate and the liquid crystal layer, wherein an extension direction of the plurality of first stripe electrodes intersects with an extension direction of the plurality of second stripe electrodes, and a voltage of each of the plurality of second stripe electrodes is independently controlled;
    a second anti-mosaic layer, disposed in between the second substrate and the liquid crystal layer;
    a second insulating layer, disposed in between the plurality of second stripe electrodes and the second anti-mosaic layer, such that the plurality of second stripe electrodes and the second anti-mosaic layer are electrically insulated from each other; and
    a controlling circuit, electrically connected to each of the plurality of first stripe electrodes and each of the plurality of second stripe electrodes; and
    wherein the first anti-mosaic layer and the second anti-mosaic layer are single anti-mosaic layers that cover the optically active region entirely, and the first anti-mosaic layer is disposed in between the plurality of first stripe electrodes and the liquid crystal layer.

2. The electrically tunable optical phase modulation element according to claim 1, further comprising alignment layers disposed on two sides of the liquid crystal layer.

3. The electrically tunable optical phase modulation element according to claim 1, wherein the width of each of the plurality of first stripe electrodes are equivalent or different, and the width of each of the plurality of second stripe electrodes are equivalent or different.

4. The electrically tunable optical phase modulation element according to claim 1, wherein the width of a gap between each of the plurality of first stripe electrodes are equivalent or different, and the width of a gap between each of the plurality of second stripe electrodes are equivalent or different.

5. The electrically tunable optical phase modulation element according to claim 1, wherein when the first anti-mosaic layer is disposed in between the plurality of first stripe electrodes and the liquid crystal layer, the electrically tunable optical phase modulation element further comprises a protection layer disposed in between the first anti-mosaic layer and the liquid crystal layer.

6. The electrically tunable optical phase modulation element according to claim 1, wherein the second anti-mosaic layer is disposed in between the second substrate and the plurality of second stripe electrodes, or the second anti-mosaic layer is disposed in between the plurality of second stripe electrodes and the liquid crystal layer.

7. The electrically tunable optical phase modulation element according to claim 6, wherein when the second anti-mosaic layer is disposed in between the plurality of second stripe electrodes and the liquid crystal layer, the electrically tunable optical phase modulation element further comprises a protection layer disposed in between the second anti-mosaic layer and the liquid crystal layer.

8. The electrically tunable optical phase modulation element according to claim 1, further comprising first dummy electrodes and second dummy electrodes, wherein the first dummy electrodes are disposed adjacent to the plurality of first stripe electrodes, and the second dummy electrodes are disposed adjacent to the plurality of second stripe electrodes.

9. The electrically tunable optical phase modulation element according to claim 1, wherein a material of the first anti-mosaic layer and the second anti-mosaic layer comprises semiconductors or conductors.

10. The electrically tunable optical phase modulation element according to claim 1, wherein each of the plurality of first stripe electrodes have the same shape or different shape and each of the plurality of second stripe electrodes have the same shape or different shape, and an arrangement of the plurality of first stripe electrodes is equivalent or different to an arrangement of the plurality of second stripe electrodes.

11. An electrically tunable optical phase modulation element, comprising at least one phase modulator, each phase modulator comprises:
a first substrate;
a second substrate, disposed opposite to the first substrate;
a liquid crystal layer, disposed in between the first substrate and the second substrate, wherein the liquid crystal layer is adapted to have an effect of an optical phase modulation in an optically active region;
a plurality of first stripe electrodes, disposed in between the first substrate and the liquid crystal layer, wherein a voltage of each of the plurality of first stripe electrodes is independently controlled;
a first anti-mosaic layer, disposed in between the first substrate and the liquid crystal layer;
a first insulating layer, disposed in between the plurality of first stripe electrodes and the first anti-mosaic layer, such that the plurality of first stripe electrodes and the first anti-mosaic layer are electrically insulated from each other;
a second conductive layer, disposed in between the second substrate and the liquid crystal layer; and
a controlling circuit, electrically connected to each of the plurality of first stripe electrodes and the second conductive layer; and
wherein the first anti-mosaic layer is a single anti-mosaic layer that covers the optically active region entirely, and the first anti-mosaic layer is disposed in between the plurality of first stripe electrodes and the liquid crystal layer.

12. The electrically tunable optical phase modulation element according to claim 11, comprising a first phase modulator and a second phase modulator, wherein the second phase modulator is stacked on top of the first phase modulator, and an extension direction of the plurality of first stripe electrodes of the first phase modulator intersects with an extension direction of the plurality of first stripe electrodes of the second phase modulator.

13. The electrically tunable optical phase modulation element according to claim 11, further comprising alignment layers disposed on two sides of the liquid crystal layer.

14. The electrically tunable optical phase modulation element according to claim 11, wherein the width of each of the plurality of first stripe electrodes are equivalent or different.

15. The electrically tunable optical phase modulation element according to claim 11, wherein the width of a gap between each of the plurality of first stripe electrodes are equivalent or different.

16. The electrically tunable optical phase modulation element according to claim 11, wherein when the first anti-mosaic layer is disposed in between the plurality of first stripe electrodes and the liquid crystal layer, the electrically tunable optical phase modulation element further comprises a protection layer disposed in between the first anti-mosaic layer and the liquid crystal layer.

17. The electrically tunable optical phase modulation element according to claim 11, further comprising first dummy electrodes, wherein the first dummy electrodes are disposed adjacent to the plurality of first stripe electrodes.

18. The electrically tunable optical phase modulation element according to claim 11, wherein a material of the first anti-mosaic layer comprises semiconductors or conductors.

19. The electrically tunable optical phase modulation element according to claim 11, wherein each of the plurality of first stripe electrodes have the same shape or different shape.

* * * * *